United States Patent [19]
Matsuyama

[11] 3,964,096
[45] June 15, 1976

[54] CASSETTE EJECTING DEVICE FOR CASSETTE-TYPE VIDEO RECORDING AND/OR REPRODUCING APPARATUS

[75] Inventor: Atsuo Matsuyama, Machida, Japan

[73] Assignee: Sony Corporation, Tokyo, Japan

[22] Filed: Dec. 2, 1974

[21] Appl. No.: 528,691

[30] Foreign Application Priority Data
Nov. 30, 1973 Japan................................ 48-135157

[52] U.S. Cl.................................... 360/85; 360/71; 360/95
[51] Int. Cl.².................. G11B 23/08; G11B 15/66; G11B 5/78
[58] Field of Search ................... 360/85, 95, 96, 92, 360/71

[56] References Cited
UNITED STATES PATENTS

| | | | |
|---|---|---|---|
| 3,740,495 | 6/1973 | Kihara | 360/85 |
| 3,852,819 | 12/1974 | Staar | 360/92 |

Primary Examiner—Alfred H. Eddleman
Attorney, Agent, or Firm—Lewis H. Eslinger; Alvin Sinderbrand

[57] ABSTRACT

A video recording and/or reproducing apparatus of the type having a tape guide drum with at least one rotary magnetic head associated therewith, a cassette holding device spaced from the drum and including a holder movable between an elevated position for receiving and discharging a tape cassette and a lowered position for operatively positioning the cassette therein, a tape loading and unloading device effective, in a loading operation, to withdraw tape from the operatively positioned cassette and to wrap the withdrawn tape about the guide drum for the recording or reproducing of video signals thereon by the rotary head and, in an unloading operation, to unwrap the tape from the guide drum and return the tape to the operatively positioned cassette, and a motor energized for operating the apparatus, for example, driving the rotary head and the capstan by which the tape is advanced during recording and reproducing operations; is further provided with a cassette ejecting device which includes a holder displacing mechanism operative, in response to rotation of a drive member, to return the cassette holder to its elevated position for discharging or ejecting the cassette therefrom, a transmission assembly having an operative state for rotating the drive member by the motive force of the above mentioned motor and an inoperative state in which the drive member is disconnected from the motor, and a control for such transmission assembly which permits the establishment of the operative state of the latter only when the tape loading and unloading device is in the condition thereof characteristic of the completion of a tape unloading operation. In a preferred embodiment, the tape loading and unloading device includes a support member moved from a starting position to an operative position during the loading operation and being returned to its starting position at the completion of the unloading operation, and the control for the transmission assembly is responsive to the positioning of such support member to hold driving and driven transmission members disengaged from each other so long as the support member is displaced from its starting position.

13 Claims, 10 Drawing Figures

CASSETTE EJECTING DEVICE FOR CASSETTE-TYPE VIDEO RECORDING AND/OR REPRODUCING APPARATUS

BACKGROUND OF THE INVENTION

1. Field of the Invention

This invention relates generally to magnetic recording and/or reproducing apparatus, such as, cassette-type video tape recording and reproducing apparatus, and more particularly is directed to improvements in a cassette holding device for such apparatus having provision for the ejection of a cassette therefrom.

2. Description of the Prior Art

Existing video tape recording and reproducing apparatus generally comprise a tape guide drum having one or more rotary magnetic heads associated therewith to record or reproduce video signals on a magnetic tape which is usually wound on supply and take-up reels with the tape between such reels being wrapped about at least a portion of the peripheral surface of the drum and being driven by a cooperating capstan and pinch roller and by suitable rotation of the take-up reel. In preparing such a video tape recording and reproducing apparatus for operation, the tape extending between the supply and take-up reels, which are preferably contained in a cassette, must be placed around or wrapped about at least a portion of the periphery of the guide drum so that the tape will be guided thereby with respect to the rotary magnetic heads.

In order to avoid the obvious disadvangates of manually withdrawing the tape between the reels from the cassette and threading the tape about the guide drum and the various other guide members and between the pinch roller and capstan in preparation for a recording or reproducing operation, and of manually removing the tape from the guide drum and returning the tape to the cassette at the completion of such an operation, automatic tape loading and unloading devices have been proposed for performing the foregoing functions.

One type of previously proposed tape loading and unloading device for a cassette-type video signal recording and/or reproducing apparatus, for example, as disclosed in detail in U.S. Pat. No. 3,821,805, issued June 28, 1974, and having a common assignee herewith, includes a support ring which is turnable around the guide drum in a substantially horizontal arcuate path that extends under the cassette when the latter is operatively positioned by the holder therefor, tape engaging members including a pinch roller which project upwardly from the support ring so as to extend into an opening of the cassette for engagement with the tape therein when the ring is in an inactive or starting position, such tape engaging members drawing a loop of tape from the cassette and wrapping one side of the tape loop about the guide drum and between the pinch roller and a capstan upon turning of the ring to an operative position during a tape loading operation, while tape guiding members also mounted on the support ring are effective to hold the other side of the tape loop away from the guide drum when the support ring is in its operative position. In an unloading operation of the foregoing device, the support ring is turned from its operative position to its inactive or starting position and, during such turning of the support ring, the tape is unwrapped from about the guide drum and returned to the cassette operatively positioned within the holder.

With a tape loading and unloading device of the type described above, the holder for the cassette has to be mounted for movement between a raised position, at which the holder is above the tape engaging and guiding members on the support ring at its inactive position and also above reel drive members so that a cassette can be slidably installed in or discharged from the raised holder, and a lowered position at which the tape engaging and guiding members project upwardly from the support ring into the opening of the cassette operatively positioned in the lowered holder and the reel drive members also extend through openings in the base plate of the holder and the bottom of the cassette housing for engagement with the reels in the latter. Upon the completion of a tape unloading operation of the tape loading and unloading device, it is necessary to return the holder to its raised position so that the tape engaging and guiding members of the tape loading and unloading device and the reel drive members will be removed from the cassette housing to permit the slidable discharge of the cassette from the raised holder. In conventional cassette-type video tape recording and/or reproducing apparatus having a tape loading and unloading device as described above, the ejecting of a cassette from the apparatus at the completion of a recording or reproducing operation has required the performance of two successive acts by the operator, namely, the actuation of a suitable control to effect the unloading operation of the tape loading and unloading device and, upon the completion of such unloading operation, the manual movement of the cassette holder from its lowered or operative position to its raised position at which the cassette can be discharged therefrom. It is apparent that the need to perform two successive manual operations is undesirable. Therefore, it has been proposed to minimize the manual operations that have to be performed for ejecting a cassette from the apparatus upon the completion of a recording or reproducing operation thereof by providing a mechanism for raising the cassette holder from its operative position upon the completion of a tape unloading operation, which mechanism is driven by a respective motor, that is, a motor in addition to that provided in the apparatus for driving the rotary magnetic heads and capstan. Such additional electric motor is relatively costly and undesirably increases the weight of the apparatus.

It has further been proposed, for example, as disclosed in detail in U.S. Pat. No. 3,833,921, issued Sept. 3, 1974, and also having a common assignee herewith, to provide a video tape recording and/or reproducing apparatus of the described type with a cassette holding device having a cassette holder movable between a raised position for receiving and discharging a cassette and a lowered operative position, as aforesaid, and in which springs continuously urge the holder to its raised position and a locking mechanism is further provided for securing the holder in its lowered operative position against the force of such springs so long as the support ring of the tape loading and unloading device is displaced from its starting position. Thus, with the foregoing cassette holding device, upon the completion of a tape unloading operation and the consequent return of the support ring to its starting position, the locking mechanism is released to permit the cassette holder to be returned to its raised position by the force of the associated springs. Although the foregoing arrangement substantially facilitates the ejection of a cassette from the apparatus at the conclusion of a recording or reproducing operation, there is an inherent disadvantage in such arrangement. More specifically, after a cassette has been inserted in the holder at the raised position thereof, the operator has to forcibly depress the cassette holder to its lowered operative position and to manually hold the holder in such lowered position against the force of the previously mentioned springs until the support ring of the tape loading and unloading device has been turned sufficiently in the course of the tape loading operation to cause the locking mechanism to retain the cassette holder in its lowered operative position.

OBJECTS AND SUMMARY OF THE INVENTION

Accordingly, it is an object of this invention to provide a cassette-type video tape recording and/or reproducing apparatus having a tape loading and unloading device, as aforesaid, with an improved cassette holding and ejecting device which is free of the above mentioned disadvantages of the prior art.

More specifically, it is an object of this invention to provide a cassette holding device for a cassette-type video tape recording and/or reproducing apparatus in which the cassette holder is easily moved from its raised position to its lowered operative position, for example, by the force of gravity, and in which, upon the completion of an unloading operation of the associated tape loading and unloading device, the cassette holder is automatically returned to its raised position for ejection of the cassette therefrom, with the motive power for such return of the cassette holder to its raised position being supplied by the motor which is energized for operating the apparatus, for example, for driving the rotary magnetic heads and capstan of the apparatus.

In accordance with an aspect of this invention, a cassette-type video tape recording and/or reproducing apparatus having a tape loading and unloading device, as aforesaid, a cassette holding device with a holder displaceable between a first or raised position for receiving or discharging a cassette and a second or lowered position at which a cassette in the holder is operatively positioned, and a motor energized for operating the apparatus, for example, for driving the rotary magnetic heads and capstan thereof, is provided with a cassette ejecting device comprising a holder displacing mechanism operative, in response to rotation of a drive member, to return the holder to its first or raised position, a transmission assembly having an operative state for rotating the drive member by the motive force of the previously mentioned motor and an inoperative state in which the drive member is disconnected from the motor, and a control for the transmission assembly which permits the establishment of the operative state of the latter only when the tape loading and unloading device is in the condition thereof characteristic of the completion of a tape loading operation. In a preferred embodiment, the tape loading and unloading device includes a support member, for example, in the form of a ring, moved from a starting position to an operative position during the loading operation of such device and being returned to its starting position at the completion of the unloading operation, and the control for the transmission assembly is responsive to the positioning of such support member to hold driving and driven transmission members disengaged from each other so long as the support member of the loading and unloading device is displaced from its starting position.

The above, and other objects, features and advantages of the invention, will be apparent from the following detailed description of an illustrative embodiment which is to be read in connection with the accompanying drawings.

DESCRIPTION OF A PREFERRED EMBODIMENT

Figure 1:
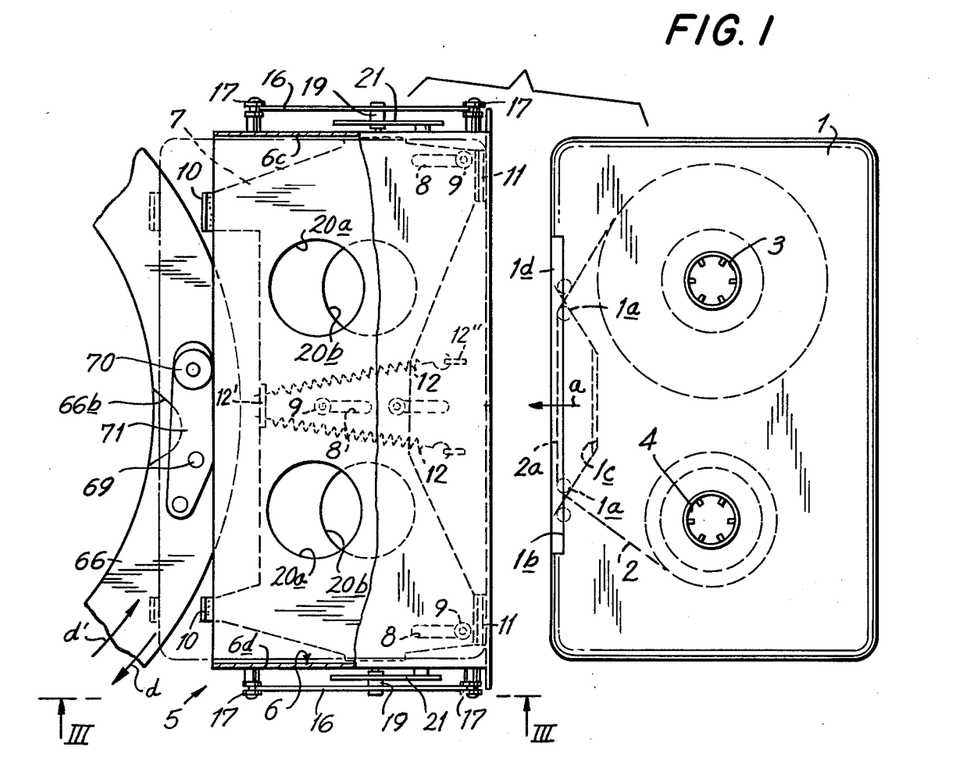
FIG. 1 is a top plan view, partly broken away, of a cassette holding device according to this invention for a cassette-type video tape recording and/or reproducing apparatus, and which is shown in its raised position for receiving a tape cassette and in association with a portion of a tape loading and unloading device.

Referring to the drawings in detail, and initially to FIG. 1 thereof, it will be seen that a recording and/or reproducing apparatus to which this invention is applied is intended for use with a conventional cassette 1 containing a magnetic tape 2 which is wound on a supply reel 3 and a take-up reel 4 rotatable within the cassette, with the tape between reels 3 and 4 being directed by guide pins 1a so as to normally follow a path including a run 2a between guide pins 1a at which the tape is exposed through an opening 1b extending along one relatively long side of cassette 1 and an opening or cutout 1c in the bottom of cassette 1 which is contiguous to opening 1b. Cassette 1 may further be provided with a pivoted lid 1d which is movable between a closed position covering at least opening 1b and an opened position in which the tape in run 2a is exposed for withdrawal from the cassette.

The recording and/or reproducing apparatus to which this invention is applied may be generally of the type disclosed in U.S. Pat. No. 3,821,805, or in U.S. Pat. No. 3,833,921 mentioned above and will be described herein only to the extent necessary for an understanding of the present invention. Such apparatus is shown (FIG. 8) to comprise a cylindrical tape guide drum 68 mounted on a chassis and having a circumferential slot or gap, with one or more rotary magnetic heads (not shown) being moved along the slot or gap, that is, in a circular path substantially coinciding with the peripheral surface of drum 68 in response to the operation of a main drive motor 58 of the apparatus. A cassette holding device 5, which will be hereinafter described in detail, is mounted on the chassis at a location spaced from guide drum 68 for receiving and operatively positioning the tape cassette 1 for a recording or reproducing operation. Rotatable reel drive members (not shown) extend upwardly from the chassis under cassette holding device 5 and are intended to respectively engage the hubs of reels 3 and 4 in cassette 1 when the latter is disposed in an operative position by means of device 5. When the reel drive members are engaged with reels 3 and 4, suitable drive assemblies (not shown) may be operative for driving take-up reel 4 in the direction winding the tape 2 thereon during recording, reproducing and fast-forward operations of the apparatus, and for driving the supply reel 3 in the direction for rewinding the tape on the latter during a rewinding operation of the apparatus. Further, a capstan 72 (FIG. 8) is rotatably mounted on the chassis and is intended to be suitably driven by drive motor 58. In order to perform recording or reproducing operations with the foregoing apparatus, it is necessary to load the tape from cassette 1 in holding device 5 about at least a portion of the periphery of guide drum 68 for scanning by the associated rotary magnetic head or heads, and further to engage the magnetic tape with capstan 72 for driving by the latter. When it is desired to remove the cassette 1 from the apparatus at the conclusion of a recording or reproducing operation, it is necessary to unload the tape from about drum 68 and return the tape to within the cassette 1.

Figure 8:
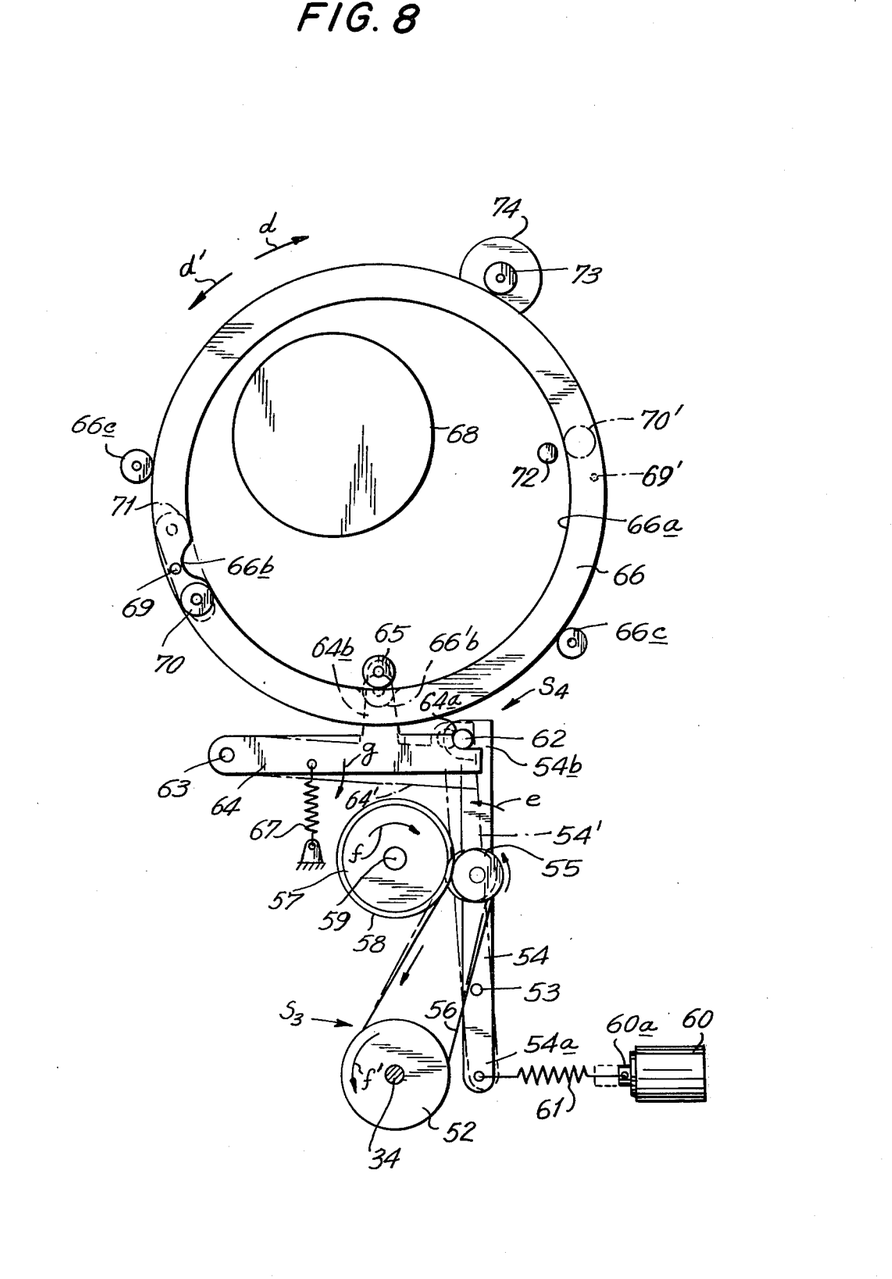
FIG. 8 is a plan view of a transmission assembly for supplying motive power to return the holder of the cassette holding device to its raised position during a cassette ejecting operation, and which is shown associated with a portion of a tape loading and unloading device.

A device for performing the above described tape loading and unloading functions may be of the type disclosed in the previously mentioned U.S. patents and is shown on FIG. 8 to generally include an annular support member 66, preferably in the form of a ring, which is rotatably supported on the chassis, for example, as by guide rollers 66c and a drive roller 73 engaging its periphery, for rotation about guide drum 68 in a circular or arcuate path that extends under the opening 1c in the bottom of tape cassette 1 when the latter is operatively positioned by cassette holding device 5, as indicated in broken lines on FIG. 1. Mounted on support ring 66 is a tape engaging assembly which is shown to include a tape engaging member or pin 69 and a freely rotatable pinch roller 70 extending upwardly from a support arm 71 which is pivoted on support ring 66. The tape engaging assembly constituted by pin 69 and pinch roller 70 is located on support ring 66 so that, when the support ring is in its starting or inactive position (FIG. 1) tape engaging pin 69 and pinch roller 70 are disposed to extend upwardly through the opening 1c at the bottom of the cassette 1 operatively positioned by cassette holding device 5, with pin 69 and pinch roller 70 being then disposed at the side of the tape run 2a facing away from opening 1b. Further, when support ring 66 is turned from its starting or inactive position in the direction of the arrow d on FIG. 8 to its operative position, the tape engaging pin 69 and pinch roller 70 will be disposed in the positions indicated in broken lines at 69' and 70', with the pinch roller being then disposed adjacent capstan 72 so that it can be urged against the capstan for cooperation with the latter in driving the magnetic tape therebetween.

The tape loading and unloading device, insofar as it has been described above, operates as follows:

Starting with support ring 66 in its starting or inactive position shown on FIG. 1 so that tape engaging pin 69 and pinch roller 70 are adapted to project upwardly into opening 1c of a cassette 1 operatively positioned by cassette holding device 5, support ring 66 is driven or turned in the direction of the arrow d on FIGS. 1 and 8, for example, by suitably energizing a reversible electric motor 74 having its shaft coupled with the driving roller 73. Such turning of ring 66 causes tape engaging pin 69 to draw a loop of the tape 2 from cassette 1 and to wrap one side of the loop about at least a portion of the periphery of guide drum 68. While the tape loop is thus being formed by tape engaging pin 69, pinch roller 70 and any other tape guiding members mounted on support ring 66 are all disposed within the tape loop. When support ring 66 attains its operative position with the tape engaging pin and pinch roller at the positions indicated in broken lines at 69' and 70' on FIG. 8, the side of the tape loop between guide drum 68 and tape engaging pin 69' passes between capstan 72 and the adjacent pinch roller 70', while the other side of the tape loop may be held away from guide drum 68 by means of additional tape guiding members (not shown) carried by support ring 66. Upon the completion of the foregoing tape loading operation, a recording or reproducing operation can be initiated and, during such operation, the tape 2 is transported about guide drum 68 from supply reel 3 to take-up reel 4, for example, by pressing pinch roller 70' against rotated capstan 72 and by suitably rotating take-up reel 4.

At any desired time, the recording or reproducing operation may be discontinued, and an unloading operation initiated by suitably energizing motor 74 so as to rotate support ring in the direction of the arrow d' so as to return ring 66 from its inoperative position to its inactive or starting position. During such turning of ring 66 one or the other of the reels 3 and 4 may be suitably rotated to take up the slack tape that results from the movement of the tape engaging pin 69 from the position shown in broken lines at 69' on FIG. 8 to the position shown on FIG. 1. Upon the return of support ring 66 to its starting or inactive position, the tape 2 is fully unwrapped from guide drum 68 and restored to the run 2a between guide pins 1a in cassette 1. Further, pinch roller 70 and pin 69 are restored to the positions indicated on FIG. 1, that is, projecting upwardly through the bottom opening 1c of the operatively positioned cassette 1.

It will be apparent that, with support ring 66 of the tape loading and unloading device in its starting or inactive position the movement of cassette 1 to and from its operative position in which tape engaging pin 69 and pinch roller 70 project upwardly in cassette opening 1c at the side of the tape run 2a facing away from opening 1b requires substantially vertical downward and upward movement, respectively, of the cassette relative to support ring 66 so that pin 69 and pinch roller 70 will be inserted in, and withdrawn from cassette opening 1c.

Figure 2:
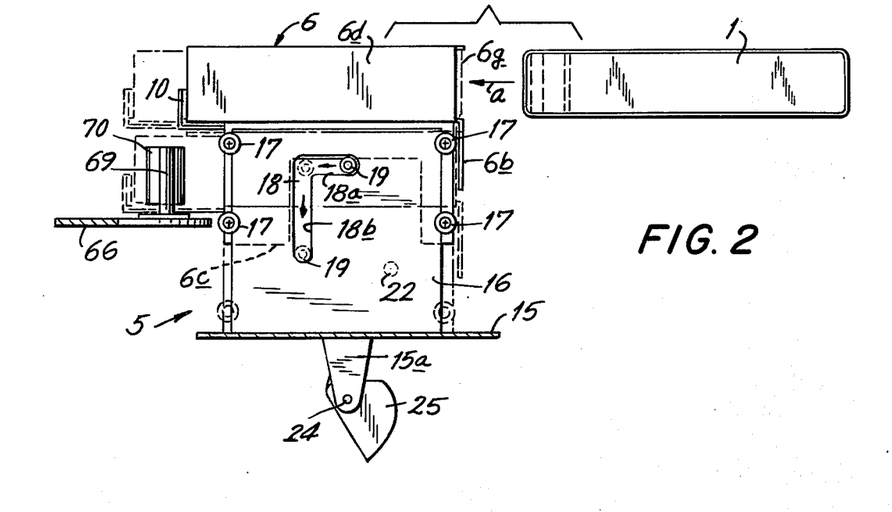
FIG. 2 is a side elevational view of the cassette holding device of FIG. 1 once again positioned for receiving a tape cassette and shown in association with a portion of a tape loading and unloading device.

In order to achieve the required vertical movements of the cassette to and from its operative positions, the holder 6 of cassette holding device 5 according to this invention is mounted for vertical movement between a raised position (FIGS. 2 and 3A) at which the cassette 1 can be received in and ejected or discharged from holder 6 and a lowered or operative position (FIG. 3B) in which the cassette 1 contained in holder 6 is operatively positioned. More specifically, the holder 6 is shown to be comprised of a table or bottom wall 6a having a flange 6b depending from its front margin, side walls 6c and 6d extending both above and below table 6a and being suitably joined to the latter at the opposite sides of the table, and a top wall 6e extending between the upper edges of side walls 6c and 6d. Thus, it will be seen that holder 6 defines an interior space 6f having openings 6g and 6h at the front and back, respectively, of the holder so that, with holder 6 in its raised position (FIGS. 2 and 3A), the cassette 1 can be slidably inserted in the direction of the arrow a into space 6f through the opening 6g at the front of the holder.

An ejecting member or plate 7 is mounted under table 6a of holder 6 for movement relative to the latter in the fore and aft direction, that is, parallel to side walls 6c and 6d, for example, by means of pins 9 depending from table 6a and engaging slidably in slots 8 formed in ejecting plate 7. A pair of laterally spaced apart abutments 10 (FIGS. 1, 2, 3A and 3B) project upwardly from the back margin of ejecting plate 7 so as to extend into the path of movement of cassette 1 at the opening 6h at the back of cassette holder 6. Tabs 11 are directed downwardly from the front edge of ejecting plate 7 and are engageable against flange 6b of holder 6 for limiting the forward movement of ejecting plate 7 relative to the cassette holder. Springs 12 are connected between a tab 12' depending from ejecting plate 7 and anchors 12'' depending from table 6a for yieldably urging ejecting plate 7 forwardly to the position shown in full lines on FIG. 3A. It will be apparent that the dimensions of holder 6 between the openings 6g and 6h at the front and back thereof is substantially smaller than the corresponding dimension of the cassette 1 to be received in the holder. Therefore, in the course of the slidable insertion of cassette 1 into holder 6 in the direction of the arrow a through the front opening 6g, the leading portion of the cassette will engage abutments 10 of ejecting slide 7 at a time when the trailing portion of the cassette still extends from the front of holder 6, as shown in full lines on FIG. 3A. During the further movement of cassette 1 in the direction of the arrow a, the engagement of the cassette with abutments 10 will cause corresponding rearward movement of ejecting slide 7 against the relatively light resistance or force of springs 12, and the rearward movement of cassette 1 relative to holder 6 will be limited, for example, at the position shown in broken lines on FIG. 3A, by the engagement of pins 9 against the forward ends of the respective slots 8 in ejecting member 7.

The cassette holder 6 is guided for vertical movement between its raised position (FIG. 3A) and its lowered or operative position (FIG. 3B) by means of grooved rollers 17 (FIGS. 1 and 2) which are rotatably mounted at the outsides of side walls 6c and 6d below table 6a and which engage opposed vertical edges of frame plates 16 extending upwardly from the chassis 15 at the opposite sides of holder 6. The frame plates 16 are further shown to be formed with inverted L-shaped slots 18 therein, with each of the slots 18 having a horizontal portion 18a directed forwardly from the upper end of a vertical slot portrion 18b. Lugs 7a are directed downwardly from the opposite side edges of ejecting plate 7, and follower or guide rollers 19 are rotatably mounted on lugs 7a and extend laterally outward therefrom through cutouts in the lower portions of the adjacent holder side walls 6c and 6d so as to be received in slots 18 in the adjacent from plates 16. The slots 18 are located and dimensioned so that, when ejecting plate 7 is in its spring-urged position shown in full lines on FIGS. 3A, follower or guide rollers 19 will be disposed in the horizontal portions 18a of the respective slots 18 so as to retain cassette holder 6 in its raised position. However, when the cassette 1 is fully inserted in holder 6 so as to displace ejecting plate 7 against the force of springs 12 to the position of the ejecting plate indicated in broken lines on FIG. 3A, follower or guide rollers 19 are similarly moved, as indicated by the arrow a'', to the upper ends of the vertical portions 18b of the respective slots 18, whereupon holder 6 can move vertically downward under the influence of gravity. During such vertical downward movement of holder 6 rollers 19 move similarly along vertical slot portions 18b until rollers 19 engage the lower ends of the respective vertical slot portions for defining the lowered or operative position of holder 6.

Figure 3A:
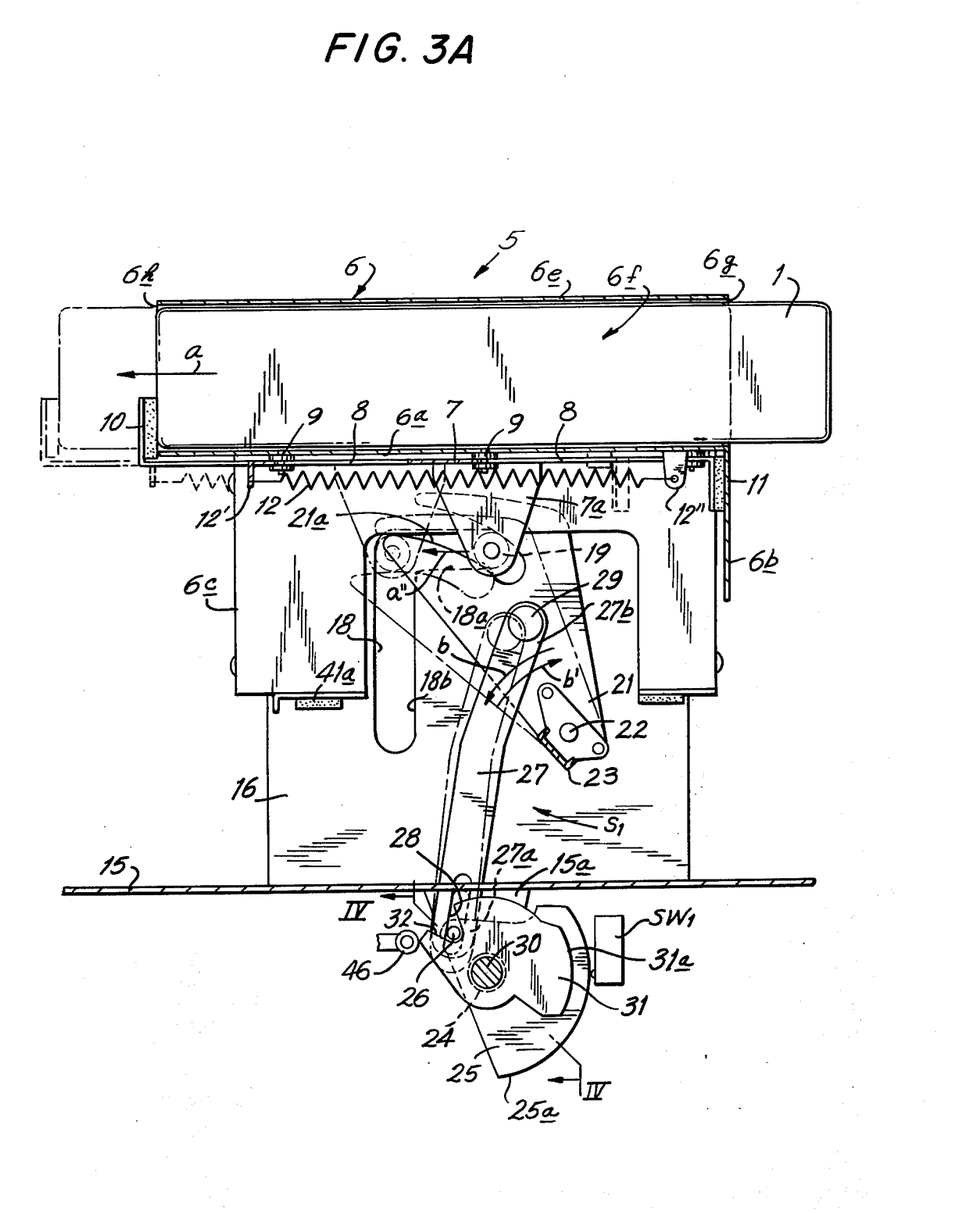
FIG. 3A is an enlarged, vertical sectional view taken along the line III—III on FIG. 1, and showing in broken lines the condition of the cassette holding device when a tape cassette has been fully inserted in the holder therefor.

As shown on FIG. 1, table 6a of holder 6 and ejecting plate 7 are formed with laterally spaced apart openings 20a and 20b, respectively, which register with each other when plate 7 is displaced to the position shown in broken lines on FIG. 3A, so that, in the course of the downward vertical movement of holder 6 to its operative position (FIG. 3B), the reel drive members (not shown) projecting upwardly from chassis 15 can extend through registered openings 20a and 20b and through similar openings in the bottom of cassette 1 for engagement with the reels 3 and 4 in the latter.

From the above it will be apparent that, with holder 6 of the cassette holding device 5 according to this invention in its raised position, the cassette 1 may be easily inserted horizontally into the holder through the front opening 6g of the latter, with only frictional resistance opposing such insertion until the cassette has reached the position shown in full lines on FIG. 3A. Thereafter, a relatively gentle push applied to the portion of the cassette still projecting from the front opening 6g will be effective to overcome the resistance of springs 12 for moving the cassette to its fully inserted position, as shown in broken lines on FIG. 3A, whereupon holder 6 with the cassette 1 therein is gravitationally moved vertically downward to its operative position (FIG. 3B) so as to project the tape engaging pin 69 and pinch roller 70 upwardly into the bottom opening 1c of the cassette, as previously described, in preparation for a tape loading operation. The cassette holding device 5 may have a conventional arrangement for effecting opening of the lid 1d of cassette 1 in response to the movement of the cassette downwardly with holder 6 to the operative position of the latter.

Figure 3B:
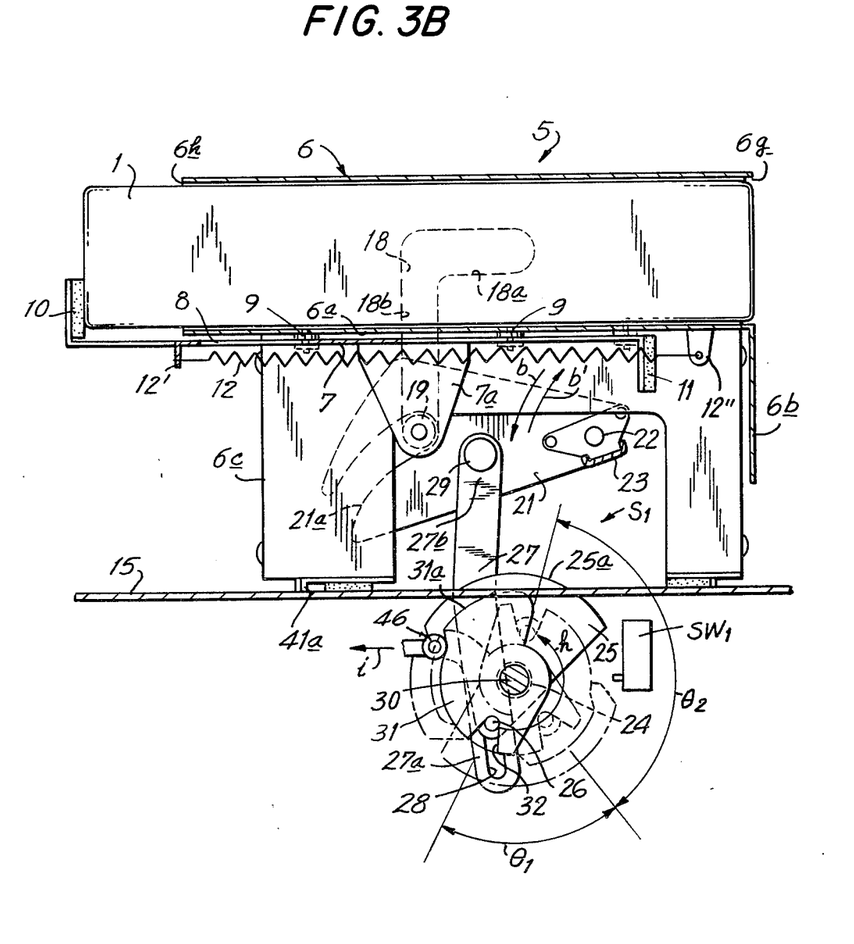
FIG. 3B is a view similar to that of FIG. 3A, but showing the cassette holding device with its cassette holder thereof in its lowered or operative position.

In accordance with this invention, the cassette holding device 5 is provided with a holder displacing mechanism $S_1$ which is operative by the motive force of the main drive motor 58 to return holder 6 from the lowered position of FIG. 3B to the raised position of FIG. 3A only when support ring 66 of the tape loading and unloading device is in its starting or inactive position characteristic of the completion of a tape unloading operation. In the illustrated embodiment of the invention, the holder displacing mechanism $S_1$ is shown to include a pair of actuating levers 21 respectively disposed adjacent the inner surfaces of the frame plates 16 and being pivotally mounted, at their lower ends, on pivot pins 22 carried by the adjacent frame plates for swinging in vertical planes between the latter and side walls 6c and 6d of holder 6. The actuating levers 21 are rigidly connected to each other by a cross member 23 for swinging as a unit. Each actuating lever 21 is shown to be formed with an arcuate slot 21a which opens, at one end, at the free end of lever 21 and which slidably receives the follower or guide roller 19 engaging in the slot 18 in the adjacent frame plate 16. The arcuate slot 21a in each lever 21 is shaped and positioned so that the rearward movement of the respective follower or guide roller 19 in the direction of the arrow a'' on FIG. 3A along the respective horizontally extending slot portion 18a will be effective to angularly displace actuating lever 21 in the direction of the arrow b from the position shown in full lines to the position shown in broken lines on FIG. 3A. Conversely, by reason of such shaping and positioning of slot 21a, the forward movement of the respective follower or guide roller 19 along horizontal slot portion 18a will be effective to angularly displace the respective actuating lever 21 in the direction of the arrow b' from the position shown in broken lines to the position shown in full lines on FIG. 3A.

The holder displacing mechanism $S_1$ is further shown to include a crank 25 rotatably mounted on a horizontal pivot or stub shaft 24 carried by a bracket 15a depending from chassis 15, a crank pin 26 mounted on crank 25, and a connecting rod 27 having a longitudinally elongated opening 28 in its lower end portion 27a which receives crank pin 26 to provide a lost-motion connection between the crank pin and connecting rod 27, while the upper end portion 27b is connected to one of the actuating levers 21 by a pivot pin 29 located between the respective slot 21a and the pivot 22 for such actuating lever.

Figure 4:
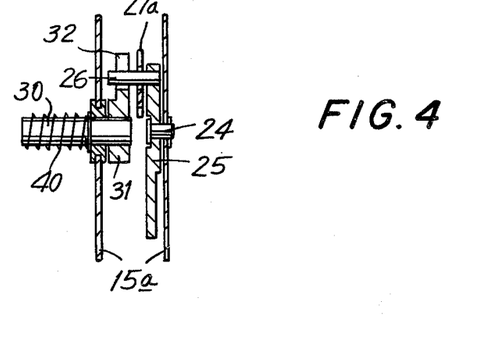
FIG. 4 is a detail sectional view taken along the line IV—IV on FIG. 3A.
Figure 5:
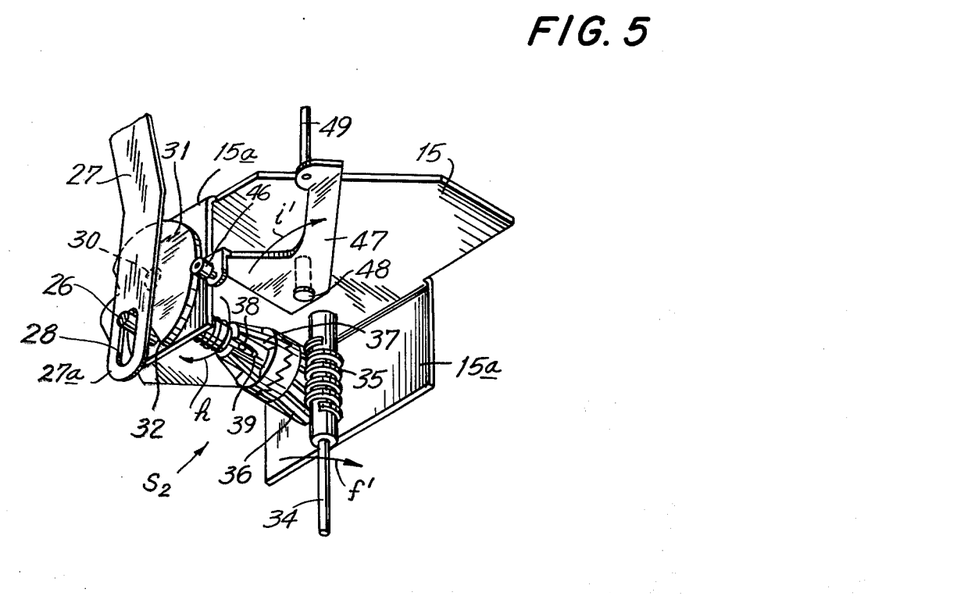
FIG. 5 is a perspective view of a portion of a holder displacing assembly by which the cassette holder is returned to its raised position for the ejection of a cassette therefrom.

Also mounted in bracket 15a coaxially with the stub shaft or pin 24 is a rotatable drive member or shaft 30 which, at the end thereof adjacent stub shaft 24, carries a drive cam 31 having a peripheral recess 32 in which crank pin 26 also engages (FIGS. 3A, 3B and 4) for transmitting rotary movements between drive member or shaft 30 and crank 25. As shown particularly on FIGS. 5 and 6, rotary drive member or shaft 30 is adapted to be rotated about its horizontal axis from a vertically disposed shaft 34 by way of a unidirectional or one-way clutch $S_2$. More specifically, as shown, a worm 35 fixed on the upper end portion of vertical shaft 34 below chassis 15 meshes with a worm gear 36 which is mounted on horizontal shaft 30 for rotation relative to the latter. A clutch element 37 is axially slidable on shaft 30 and rotatably coupled with the latter, as by pins 38 secured to shaft 30 and slidably engaging in axial slots 39 in clutch element 37, and a compression spring 40 is provided on shaft 30 to urge clutch element 37 axially in the direction toward worm gear 36. The confronting end faces of worm gear 36 and clutch element 37 have complementary raked or saw-tooth teeth 36a and 37a, respectively, which are urged into meshing engagement with each other by spring 40 for transmitting rotational movement from shaft 34 to drive members or shaft 30 only in the direction of the arrow h on FIG. 5, while permitting free-wheeling of drive member or shaft 30 when the holder displacing assembly $S_1$ serves to drive shaft 30 in the direction of the arrow h during the gravitational movement of holder 6 from its raised position to its operative position, as hereinafter described in detail.

As shown in FIGS. 3A and 3B, a cam surface 25a is formed on crank 25 at the portion of the latter substantially diametrically opposite the location of crank pin 26 for actuating a switch $SW_1$ which is suitably mounted adjacent crank 25. Switch $SW_1$ is arranged to be in its open or OFF state when engaged or actuated by cam surface 25a in response to the disposition of cassette holder 6 in its raised position (FIG. 3A), while switch $SW_1$ is in its closed or ON state when cam surface 25a is moved out of engagement with the switch actuator in response to the movement of holder 6 to its lowered or operative position (FIG. 3B). Further, as shown on FIG. 9, switch $SW_1$ may be mounted in series with the main drive motor 58 in the energizing circuit for the latter so that such main drive motor is automatically energized upon the movement of holder 6 to its lowered operative position, and the motor 58 is deenergized upon the return of holder 6 to its raised position.

Figure 6:
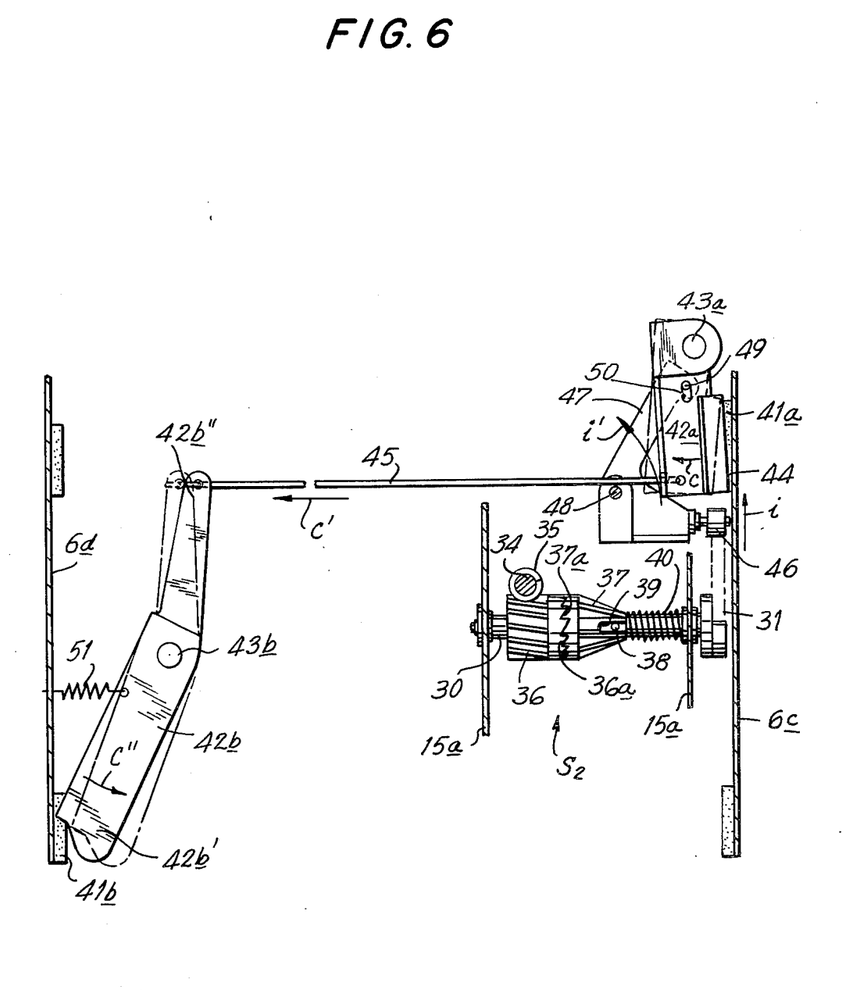
FIG. 6 is a plan view of a latching assembly included in the cassette holding device according to this invention, and by which the cassette holder thereof is locked or retained in its operative position for release therefrom only upon a cassette ejecting operation.
Figure 7:
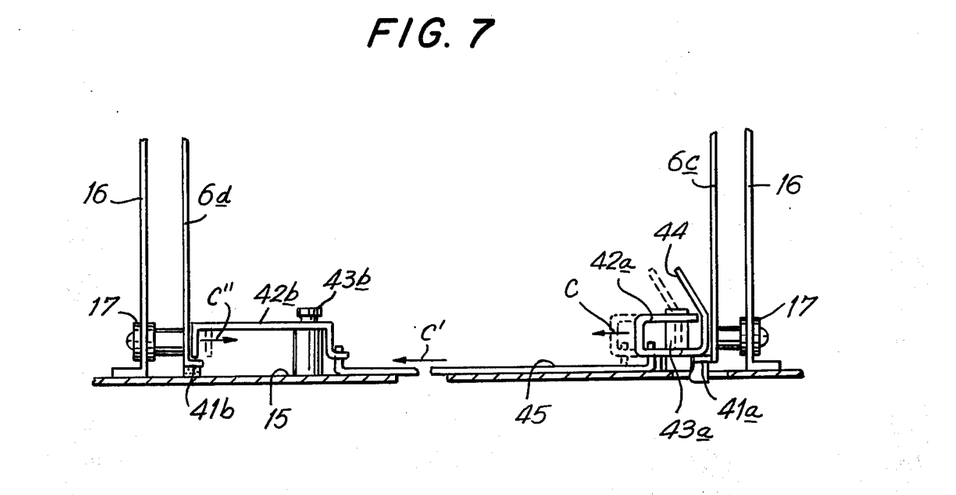
FIG. 7 is a front elevational view of the latching assembly of FIG. 6.

Referring now to FIGS. 6 and 7, it will be seen that the cassette holding device according to this invention is preferably provided with a latching assembly operative, upon the gravitational movement of holder 6 to its operative position, for securing or locking the holder at such position until such time as the holder displacing assembly or mechanism $S_1$ is operated for returning the holder to its raised position. In the illustrated embodiment, such latching assembly is shown to include inwardly directed tabs 41a and 41b extending from the bottom edges of side walls 6c and 6d of holder 6 so as to be disposed immediately adjacent chassis 15 in the operative position of the holder. A latching lever 42a is pivotally mounted at 43a on chassis 15 for engaging over tab 41a when holder 6 is in its operative position. Similarly, a latching lever 42b is pivotally mounted, intermediate its ends, on a pivot 43b carried by chassis 15 so that one end portion 42b' of lever 42b will be engageable over tab 41b when holder 6 is in its operative position. Latching lever 42a is further shown to have an inclined portion 44 extending upwardly therefrom and being engageable by the respective tab 41a during the movement of holder 6 toward its operative position so as to deflect latching lever 42a in the direction of the arrow c and thereby permit tab 41a to pass latching lever 42a for engagement from above by the latter when holder 6 attains its operative position. A link rod 45 is pivotally connected, at its opposite ends, to latching lever 42a and to end portion 42b'' of latching lever 42 b so that the deflection or pivotal movement of latching lever 42a in the direction of the arrow c will effect longitudinal movement of rod 45 in the direction of the arrow c' and thereby cause pivotal deflection of latching lever 42b in the direction of the arrow c'' for moving the end portion 42b' of the latter latching lever to a released position relative to the respective tab 41b. Further, a spring 51 is connected between latching lever 52b and a suitable anchor on the chassis (FIG. 6) for urging latching lever 42b to its operative or engaged position in which end portion 42b' of that lever engages over the respective tab 41b. By reason of the rod 45 connecting latching levers 42a and 42b, the force of spring 51 is also effective to urge latching lever 42a to its engaged or operative position in respect to tab 41a.

In order to effect the release of the above described latching mechanism upon initiation of an operation of the holder displacing mechanism $S_1$ for moving holder 6 from its operative position to its raised position, a cam follower roller 46 engageable with driving cam 31 (FIGS. 3A, 3B, 5 and 6) is mounted on one end of a bell crank 47 which is pivoted, intermediate its ends, on a pivot pin 48 carried by chassis 15, and which has an upstanding actuating pin 49 at its other end (FIG. 5) received in an elongated opening 50 provided in latching lever 42a (FIG. 6). As shown particularly on FIGS. 3A and 3B, driving cam 31 has a radially raised peripheral portion 31a which, when engaged with cam follower roller 46 upon the initial rotation of drive member or shaft 30 in the direction of the arrow h from the position shown on FIG. 3B, is effective to move roller 46 in the direction of the arrow i and thereby angularly displace bell crank 47 in the direction of the arrow i' on FIGS. 5 and 6. By reason of the engagement of actuating pin 49 in elongated opening 50, such angular displacement of bell crank 47 is effective to pivot latching lever 42a in the direction of the arrow c (FIG. 6) and thereby to release such latching lever from the respective tab 41a. By reason of the connecting rod 45, latching lever 42b is also pivoted to release its end portion 42b' from the respective tab 41b.

Referring now to FIG. 8, it will be seen that the shaft 34, and hence the shaft 30 for driving the holder displacing mechanism $S_1$, is adapted to be driven by the motive force of main drive motor 58 through a transmission assembly $S_3$ only when such transmission assembly is in an operative state thereof. In the illustrated embodiment, the transmission assembly $S_3$ includes a pulley 52 fixed on shaft 34, a lever 54 pivoted, as at 53, on the chassis and carrying a pulley 55, a drive belt 56 running around pulleys 52 and 55, and a drive wheel 57 fixed on the shaft 59 of motor 58 and being frictionally engageable with a suitable surface on pulley 55 for driving the latter and, through belt 56, the pulley 52 only when lever 54 is angularly displaced from the position shown in full lines to the position shown in broken lines at 54' and which corresponds to the operative state of transmission assembly $S_3$. Further, as shown, a solenoid 60 has its armature 60a connected through a spring 61 to one end 54a of lever 54 so that, upon energizing of solenoid 60 to retract its armature 60a, as shown in full ines on FIG. 8, lever 54 will be yieldably urged by spring 61 to pivot to its operative position indicated in broken lines at 54' for establishing the operative state of transmission assembly $S_3$.

However, in order to ensure that the operative state of transmission assembly $S_3$ will only be established to cause operation of holder displacing assembly $S_1$ for moving holder 6 to its raised position at a time when the magnetic tape is fully contained within the cassette 1, that is, upon the completion of a tape unloading operation, a blocking assembly $S_4$ is provided to permit movement of lever 54 to its operative position only when support ring 66 of the tape loading and unloading device is in its starting or inactive position characteristic of the completion of an unloading operation thereof. In the illustrated embodiment, the blocking assembly $S_4$ includes a pin or abutment 62 mounted on the end 54b of the pulley-carrying lever 54, and a blocking lever 64 which is pivotally mounted, at one end, o a pivot pin 63 carried by the chassis and which has a shoulder 64a at its other end which is movable into and out of the path of travel of abutment 62 that results from the movement of lever 54 in the direction of the arrow e. An arm 64b extends laterally from lever 64 and carries a roller 65 which is engageable with the inner peripheral edge 66a of support ring 66. A spring 67 acts on blocking lever 64 for urging the latter in the direction of the arrow g, that is, for maintaining engagement of roller 65 with the inner peripheral edge 66a which constitutes a cam surface for the roller 65 and is formed with a recess 66b located to receive roller 65, as indicated in broken lines at 66'b on FIG. 8, when support ring 66 is in its starting or inactive position. Accordingly, when support ring 66 is in its starting or inactive position, the reception of roller 65 in recess 66'b permits spring 67 to move blocking lever 64 to the position indicated in broken lines at 64' with the result that shoulder 64a is moved out of the path of abutment or pin 62 on lever 54 to permit the angular displacement of the latter to the position indicated in broken lines at 54', and thereby to engage pulley 55 with drive wheel 57. However, whenever support ring 66 is turned from its inactive or starting position, that is, whenever the tape loading and unloading device is effective to withdraw tape from a cassette operatively positioned by cassette holding device 5, recess 66b is displaced from roller 65 and thus blocking lever 64 is held in the position shown in full lines on FIG. 8 with its shoulder 64a being engageable by pin or abutment 62 to block the movement of lever 54 from the position shown in full lines, in which position pulley 55 is held out of engagement with drive wheel 57.

Figure 9:
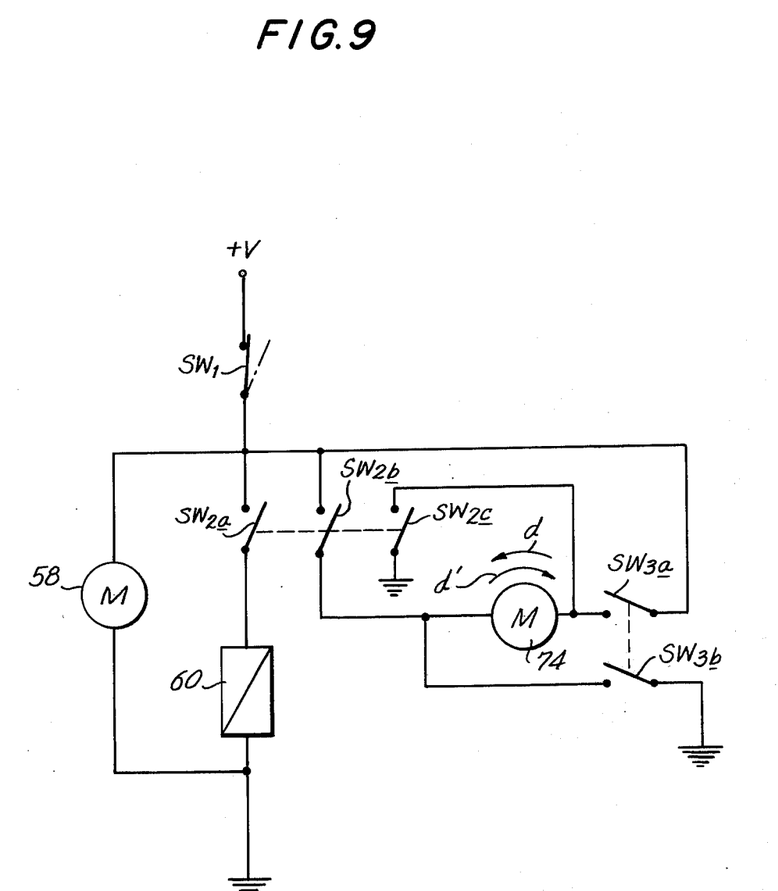
FIG. 9 is a schematic circuit diagram showing control circuits that may be employed in connection with the cassette holding and ejecting devices according to this invention.

As shown on FIG. 9, the circuits for controlling the above described apparatus embodying this invention on may include three normally open ganged switches $SW_{2a}$, $SW_{2b}$ and $SW_{2c}$ which are simultaneously changed over to their closed state upon the manual actuation of a push-button or the like for selecting the ejecting operation of the apparatus. As shown, switch $SW_{2a}$ may be connected in series with switch $SW_1$ and solenoid 60 in the circuit for energizing the latter, while switches $SW_{2b}$ and $SW_{2c}$ are connected in series with switch $SW_1$ and reversible motor 74 in the circuit for energizing the motor 74 so as to effect rotation of support ring 66 in the direction of the arrow d' on FIG. 8, that is, in the direction for returning support ring 66 from its operative position to its inactive or starting position during an unloading operation of the tape loading and unloading device. Normally open ganged switches $SW_{3a}$ and $SW_{3b}$ which are adapted to be closed in response to the manual actuation of a push-button or the like for selecting a loading operation of the tape loading and unloading device are also connected in series with switch $SW_1$ and motor 74, but in a circuit for energizing reversible motor 74 so as to operate the latter in the direction for turning support ring 66 in the direction of the arrow d on FIG. 8, that is, in the direction from its inactive or starting position toward its operative position. The circuits for energizing reversible motor 74 may further include suitable limit switches (not shown) which, as is conventional, are arranged to halt the operation of motor 74 when support ring 66 has arrived at its operative and inactive or starting positions at the completion of the loading and unloading operations, respectively.

The recording and/or reproducing apparatus having the above described cassette holding and ejecting devices according to this invention operates as follows:

Starting with the cassette holding device 5 and its holder displacing mechanism $S_1$ in the condition shown on FIG. 3A, the cassette 1 is inserted horizontally in the direction of the arrow $a$ into the raised holder 6 through the front opening 6g of the latter until the leading portion of the cassette engages and drives before it the abutments 10 on ejecting slide 7 for moving the latter to the position shown in broken lines whereupon, as previously described, holder 6, with the cassette therein, moves vertically downward under the influence of gravity to its operative position shown on FIG. 3B. During the movement of ejecting plate 7 from the position shown in full lines on FIG. 3A to the position shown in broken lines in response to the insertion of cassette 1 in holder 6, follower or guide rollers 19 move rearwardly along the horziontal portions 18a of the respective slots 18 and also along the arcuate slots 21a in the respective actuating levers 21 with the result that levers 21 are angularly displaced in the direction of the arrow $b$ from the position shown in full lines to the position shown in broken lines on FIG. 3A while connecting rod 27 is displaced so as to take up at least some of the lost-motion between crank pin 26 and slot 28, but without effecting rotation of cam 31 and crank 25. During the vertical downward movement of holder 6 from its raised position to its operative position, follower or guide rollers 19 move downwardly along the respective vertical slot portions 18b while remaining engaged in slots 21a of actuating levers 21 for further turning the latter in the direction of the arrow $b$, for example, to the position shown on FIG. 3B. During such further turning of actuating levers 21, crank pin 26 engages the upper end of the respective slot 28 so that connecting rod 27 causes turning of crank 25 and cam 31 in the direction of the arrow $h$ to the positions shown on FIG. 3B upon the arrival of holder 6 in its lowered or operative position.

It will be seen that, upon the arrival of cassette holder 6 at its lowered operative position, cam surface 25a on crank 25 has been moved away from switch $SW_1$ so that the latter can assume its normal closed condition shown on FIG. 9 for effecting operation of the main drive motor 58. Further, upon the arrival of cassette holder 6 at its operative position, driving cam 31 is positioned so that cam follower roller 46 is about to ascend the radially raised cam portion 31a. Of course, during the downward movement of cassette holder 6 from its raised position to its operative position, the resultant turning of drive member or shaft 30 in the direction of the arrow $h$ may cause slippage at the one-way clutch $S_2$, that is, shaft 30 may free wheel or turn without effecting turning of shaft 34.

During the final increment of downward movement of holder 6 to its operative position, tab 41a at the bottom of its side wall 6c engages the inclined portion of latching lever 42a for deflecting the latter to its released position and, by reason of the connecting rod or link 45, also deflecting the latching lever 42b to its released position, whereby to permit tabs 41a and 41b to pass the respective latching levers 42a and 42b and to come to rest against chassis 15. Thereupon, spring 51 acting on latching lever 42b (FIG. 6) is effective to return both latching levers 42a and 42b to their operative positions engaging over tabs 41a and 41b, respectively, for locking holder 6 in its operative position.

With the cassette 1 being thus operatively positioned by cassette holding device 5, the push-button associated with ganged switches $SW_{3a}$ and $SW_{3b}$ may be actuated for closing such switches and thereby initiating a loading operation of the tape loading and unloading device during which support ring 66 is turned from its inactive or starting position to its operative position for withdrawings tape from the cassette 1 and wrapping the tape about guide drum 68, as previously described. At the completion of the tape loading operation, either a recording or reproducing operation of the apparatus may be performed in a conventional manner. It will be noted that, during such recording or reproducing operation, blocking lever 64 is securely held in the position shown in full lines on FIG. 8 so that its shoulder 64a is engageable by pin or abutment 62 on lever 54 for preventing engagement of pulley 55 with drive wheel 57. Thus, although main drive motor 58 is continuously operated for rotating the magnetic heads associated with guide drum 68 and capstan 72, the motive force of motor 58 cannot be transmitted to shaft 34 and hence to drive member or shaft 30 for effecting return movement of holder 6 to its raised position so long as tape is withdrawn from the cassette 1 in such holder.

When it is desired to remove cassette 1 from cassette holding device 5, for example, at the completion of a recording or reproducing operation, the push-button associated with ganged switches $SW_{2a}$, $SW_{2b}$ and $SW_{2c}$ is manually actuated for closing such switches and thereby selecting or initiating the ejecting operation. As previously indicated, the closing of switches $SW_{2b}$ and $SW_{2c}$ is effective to cause operation of motor 74 for turning support ring 66 in the direction of the arrow $d'$ from its operation position back to its inactive or starting position so as to perform the unloading operation of the tape loading and unloading device during which the tape is unwrapped from about guide drum 68 and returned to the operatively positioned cassette, as previously described. The simultaneous closing of switch $SW_{2a}$ serves to energize solenoid 60 for retracting its armature 60a. Although the retraction of armature 60a causes spring 61 to urge lever 54 in the direction of the arrow $e$ on FIG. 8, that is, in the direction for engaging pulley 55 with drive wheel 57, such engagement is prevented by the continued blocking of the movement of abutment or pin 62 by shoulder 64a on blocking lever 64. Thus, until support ring 66 returns to its inactive or starting position in which recess 66b receives roller 65, the energizing of solenoid 60 merely increases the force exerted by spring 61 on lever 54. However, upon the return of support ring 66 to its starting position, that is, when the tape has been fully returned to cassette 1 at the completion of the tape unloading operation, recess 66b in ring 66 registers with roller 65 so that spring 67 can displace blocking lever 64 to remove its shoulder 64a from the path of pin 62, whereupon the increased force or energy stored in spring 61 can displace lever 54 to the position shown in broken lines at 54' and thereby engage pulley 55 with drive wheel 57. Upon such engagement of pulley 55 with drive wheel 57, transmission assembly $S_3$ is effective to rotate shaft 34 and such rotation is transmitted through worm 35, worm gear 36 and one-way clutch $S_2$ to drive member or shaft 30 for rotating the latter in the direction of the arrow $h$ from the position shown on FIG. 3B.

Immediately upon the initiation of rotation of shaft 30 and hence of cam 31 secured thereon from the position shown in full lines on FIG. 3B, the radially raised cam surface 31a of cam 31 will come into engagement with roller 46 for displacing the latter in the direction of the arrow *i*. As previously noted such displacement of roller 46 will effect angular displacement of bell crank 47 in the direction of the arrow *i'* on FIG. 5 with the result that the actuating pin 49 on the bell crank will move latching lever 42*a* to its disengaged position and such movement of latching lever 42*a* will be transmitted through rod 45 to latching lever 42*b* for also moving the latter to its disengaged position. Accordingly, tabs 41*a* and 41*b* are released to free holder 6 for upward movement away from its operative position. It will be noted that during such initial rotation of shaft 30 and cam 31 from the positions shown in full lines on FIG. 3B for effecting disengagement or release of the latching levers 42*a* and 42*b*, as described above, the corresponding angular displacement of crank pin 26, for example, through the angle $\theta_1$ is effected without causing upward longitudinal displacement of connecting rod 27, that is, rod 27 is merely pivoted about its pivotal connection 29 with the respective actuating lever 21 during the movement of crank pin 26 through the angular range $\theta_1$. However, after latching levers 42*a* and 42*b* have been disengaged or released, as described above, the further angular displacement of crank pin 26 in the direction of the arrow *h*, for example, through the angular range indicated at $\theta_2$ on FIG. 3B, causes upward driving of connecting rod 27 and corresponding upward pivoting of actuating levers 21, for example, to the position indicated in broken lines on FIG. 3A. Of course, during such upward pivoting of actuating levers 21, the engagement of follower or guide rollers 19 in the arcuate slots 21*a* will cause the upward movement of rollers 19 along the respective vertical slot portions 18*b*, with the result that holder 6 is moved upwardly to its raised position.

Substantially simultaneously with the arrival of actuating levers 21 at the positions indicated in broken lines on FIG. 3A, cam surface 25*a* on crank 25 moves into engagement with switch $SW_1$ for actuating the latter to its open condition and thereby halting the operation of main drive motor 58. Further, upon the arrival of follower or guide rollers 19 at the upper ends of the respective vertical slot portions 18*b*, such rollers 19 are then free to travel forwardly along the respective horizontal slot portions 18*a* under the influence of springs 12 acting on ejecting plate 7. Thus, ejecting plate 7 is driven forwardly to the position shown in full lines on FIG. 3A with the result that the abutments 10 on plate 7 similarly drive the cassette 1 for at least partly ejecting the latter through the front opening 6*g* of the raised holder. It will further be noted that during the forward movement of rollers 19 along the respective horizontal slot portions 18*a*, the rollers 19 also move inwardly along the respective slots 21*a* for further turning the respective actuating levers 21 back to the starting positions shown in full lines on FIG. 3A. During such final return of actuating levers 21 to their starting positions, the inertia of the drive for crank 25 may cause further turning of the latter to the position shown on FIG. 3A with the result that crank pin 26 is moving downwardly relative to connecting rod 27, and such relative movement is accommodated by the engagement of crank pin 26 in elongated opening or slot 28. It is further to be noted that, in the course of the return of holder 6 to its raised position, cam follower roller 46 moves off the radially enlarged portion 31*a* of cam 31 to permit spring 51 to return latching levers 42*a* and 42*b* to their operative positions for subsequent engagement with the respective tabs 41*a* and 41*b* when the cassette holder is next displaced to its lowered or operative position. With the circuit arrangement shown on FIG. 9, the opening of switch $SW_1$ by the action of cam surface 25*a* thereon in response to the return of holder 6 to its raised position is also effective to halt the energizing of solenoid 60 and, with the release of the pushbutton or the like provided for actuating the ganged switches $SW_{2a}$, $SW_{2b}$ and $SW_{2c}$ to select the ejecting operation, all of the components of the apparatus are returned to their original conditions.

It will be apparent from the above description of a cassette holding and ejecting device according to this invention that the operator need apply only a relatively small force for moving the holder 6 with a cassette therein to its operative position, and that only a single manual operation, that is, the actuation of the ganged switches $SW_{2a}$–$SW_{2c}$, is required for achieving an unloading operation of the associated tape loading and unloading device and, upon the completion of such operation, the automatic ejecting of the cassette from the holder upon the movement of the latter to its raised position. Further, the motive force for such movement of the cassette holder to its raised position is provided by the already existing main drive motor 58 of the apparatus.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In a cassette-type recording and/or reproducing apparatus that includes a tape guide drum with at least one rotary magnetic head moved in a circular path substantially coinciding with the periphery of said drum, a cassette holding device spaced from said drum and having a holder displaceable between a first position at which a tape cassette is insertable in, and removable from said holder and a second position at which the cassette in said holder is operatively positioned, a tape loading and unloading device operative, in a loading operation thereof, to withdraw tape from the operatively positioned cassette and wrap the withdrawn tape about at least a portion of the periphery of said guide drum for scanning by each said rotary head and, in an unloading operation, to unwrap the tape from said guide drum and return the tape to the operatively positioned cassete, and a motor which is energizable for operating the apparatus: the combination of motor control means for initiating the energizing of said motor upon the displacement of said holder to said second position and continuing said energizing of the motor until said holder is returned to said first position; and a cassette ejecting device comprising holder displacing means operative to return said holder from said second position to said first position, a drive member which is rotatable for effecting operation of said holder displacing means, transmission means having an operative state in which said drive member is connected with said motor so as to be rotated by the motive force of the latter for operating said holder displacing means and an inoperative state in which said drive member is disconnected from said motor, and control means responsive to a condition of said tape loading and unloading device for permitting establishment of said operative state of the transmission means only when the condition of said tape loading and unloading device corresponds to that at the completion of said unloading operation thereof.

2. A cassette-type recording and/or reproducing apparatus according to claim 1; in which said tape loading and unloading device includes a support member moved from a starting position to an operative position in the course of said loading operation and being returned to said starting position upon said completion of the unloading operation, and said control means detects the presence of said support member in said starting position for permitting establishment of said operative state of the transmission means.

3. A cassette-type recording and/or reproducing apparatus according to claim 2; in which said transmission means includes driving and driven transmission members respectively coupled to said motor and said drive member, and means mounting one of said transmission members for movement relative to the other of said transmission members in one direction for engagement with each other in said operative state and in the opposite direction for disengagement from each other in said inoperative state; and in which said control means includes means operative for urging said one transmission member in said one direction, and blocking means for blocking the movement of said one transmission member in said one direction except when said support member of the tape loading and unloading device is in said starting position thereof.

4. A cassette-type recording and/or reproducing apparatus according to claim 3; in which said blocking means includes an abutment on said means mounting said one transmission member, a blocking member movable into and out of the path of movement of said abutment with said one transmission member in said one direction, a cam follower connected with said blocking member, and a cam surface on said support member engaged by said cam follower to dispose said blocking member in said path of movement of the abutment when said support member is displaced from said starting position thereof.

5. A cassette-type recording and/or reproducing apparatus according to claim 3; in which said means operative for urging said one transmission member in said one direction includes a solenoid, and spring means connecting said solenoid with said means mounting said one transmission member so that the latter is urged in said one direction by said spring means upon energizing of said solenoid.

6. A cassette-type recording and/or reproducing apparatus according in claim 1; in which said holder has an opening at least at the front thereof through which the tape cassette is slidably insertable and removable; and in which said cassette ejecting device includes an ejecting member mounted on said holder for movement relative to the latter in directions away from and toward said front of the holder, said ejecting member being engageable and movable in said direction away from the front of said holder by a cassette upon the insertion of the latter in the holder through said front opening, spring means yieldably urging said ejecting member in said direction toward the front of said holder, and guide means for said ejecting member blocking movement of the latter in said direction toward the front of said holder upon displacement of the latter from said first position so that said ejecting member is moved by said spring means in said direction toward the front of said holder for projecting the cassette out of said front opening only upon the return of said holder to said first position by said holder displacing means.

7. A cassette-type recording and/or reproducing apparatus according to claim 6; in which said cassette holding device further includes a frame, and means guiding said holder for substantially vertical movements in respect to said frame between said first and second positions of the holder; and in which said guide means for the ejecting member includes at least one slot having a vertical portion and a horizontal portion extending forwardly from one end of said vertical portion, and follower means extending from said ejecting member and being slidably along each said slot so as to engage in said horizontal portion of the slot when said holder is in said first position.

8. A cassette-type recording and/or reproducing apparatus according to claim 7; in which said first position of the holder is spaced upwardly from said second position, and said horizontal portion of each said slot extends from the upper end of said vertical portion so that said holder is movable by gravity from said first position to said second position when said ejecting member is moved by a cassette inserted in said front opening of the holder so as to displace said follower means along said horizontal portion of the slot to said upper end of the vertical portion.

9. A cassette-type recording and/or reproducing apparatus according to claim 8; further comprising one-way clutch means interposed between said transmission means and said rotatable drive member for transmitting operating torque only in the direction from said transmission means to said drive member and permitting free-wheeling of said drive member by said holder displacing means during the gravitational movement of said holder from said first position to said second position.

10. A cassette-type recording and/or reproducing apparatus according to claim 1; in which said motor control means includes a switch, and a switch operating cam coupled with said rotatable drive member.

11. A cassette-type recording and/or reproducing apparatus according to claim 8; in which said holder displacing means includes a crank pin coupled with said drive member to move in a circular path upon rotation of said drive member, an actuating lever pivoted on said frame and having a slot along which said follower means is also movable, and a connecting rod pivotally connected at its opposite ends to said actuating lever and to said crank pin, respectively.

12. A cassette-type recording and/or reproducing apparatus according to claim 11; in which said connecting rod depends from said actuating lever and the lower end portion of said rod has a longitudinally elongated opening receiving said crank pin for the pivotal connection of the latter to said rod; and further comprising latch means operative upon the gravitational movement of said holder to said second position for securing said holder thereat, and latch releasing means operative in response to initial rotation of said drive member for releasing said latch means and thereby freeing said holder for displacement from said second position with said crank pin moving along said elongated opening of the connecting rod during said initial rotation so that said holder displacing means commences the return of said holder from said second position to said first position only after the release of said latch means.

13. A cassette-type recording and/or reproducing apparatus according to claim 1; further comprising latch means operative upon the arrival of said holder in said second position for securing said holder thereat, and latch releasing means operative in response to initial rotation of said rotatable drive member for releasing said latch means and thereby freeing said holder for displacement from said second position thereof; and in which said holder displacing means includes lost-motion connecting means at which there is relative movement during said initial rotation of the rotatable drive member so that said holder displacing means commences the return of said holder from said second position to said first position only after said initial rotation of the drive member.

* * * * *